US 6,554,096 B2

(12) United States Patent
Tokumoto

(10) Patent No.: US 6,554,096 B2
(45) Date of Patent: Apr. 29, 2003

(54) TORQUE DETECTING APPARATUS AND STEERING APPARATUS

(75) Inventor: Yoshitomo Tokumoto, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 18 days.

(21) Appl. No.: 09/960,499

(22) Filed: Sep. 24, 2001

(65) Prior Publication Data

US 2002/0036112 A1 Mar. 28, 2002

(30) Foreign Application Priority Data

Sep. 28, 2000 (JP) ........................................ 2000-297372

(51) Int. Cl.[7] ................................................. B62D 5/04
(52) U.S. Cl. ....................... 180/446; 180/443; 180/444
(58) Field of Search ................................ 180/443, 444, 180/446; 701/41, 42; 73/1.09, 862.08, 862.193, 862.192

(56) References Cited

U.S. PATENT DOCUMENTS

| | | | | |
|---|---|---|---|---|
| 5,473,539 A | * | 12/1995 | Shimizu et al. | ................ 701/41 |
| 5,612,877 A | * | 3/1997 | Shimizu et al. | ................ 701/41 |
| 5,927,425 A | * | 7/1999 | Kusano | ....................... 180/446 |
| 6,148,948 A | * | 11/2000 | Shimizu et al. | ............. 180/446 |
| 6,148,949 A | * | 11/2000 | Kobayashi et al. | ............ 701/41 |
| 6,381,525 B1 | * | 4/2002 | Hori et al. | ................... 180/444 |
| 2001/0023383 A1 | * | 9/2001 | Ishihara et al. | ................ 701/41 |
| 2002/0125064 A1 | * | 9/2002 | Mori et al. | .................... 701/41 |

FOREIGN PATENT DOCUMENTS

| | | | | |
|---|---|---|---|---|
| EP | 989046 A1 | * | 3/2000 | ............ B62D/5/04 |
| JP | A2000352502 | | 12/2000 | |
| JP | A2001133338 | | 5/2001 | |
| JP | 2001201313 A | * | 7/2001 | ............ G01B/7/30 |
| WO | A10062031 | | 10/2000 | |

* cited by examiner

Primary Examiner—Lesley D. Morris
Assistant Examiner—Daniel Yeagley
(74) Attorney, Agent, or Firm—Birch, Stewart, Kolasch & Birch, LLP.

(57) ABSTRACT

A torque detecting apparatus for each input shaft and output shaft that are connected with a torsion bar, a detecting device for detecting regions of a plurality of targets arranged so that the regions to be detected change periodically and continuously with rotation of rotors for detecting a torque applied to the input shaft based on a difference between the detected regions resulting from twist of the torsion bar, a correction section for obtaining a correction amount for each of the targets so as to correct the detected regions upon one rotation of the rotors based on the maximum values of signals indicating the regions of each of the targets detected by the detecting device, a storing section storing the correction amounts, a correcting section for correcting the regions detected by the detecting device based on the correction amounts stored in a storing section for storing the correction amounts for the targets discriminated by a discriminating section, the torque detecting apparatus capable of restraining the influence of rotational deflection and detecting a more accurate steering torque.

4 Claims, 9 Drawing Sheets

TORQUE DETECTING APPARATUS AND STEERING APPARATUS

BACKGROUND OF THE INVENTION

The present invention relates to a torque detecting apparatus comprising, for each of an input shaft and an output shaft that are connected with a torsion bar, a rotor; a plurality of targets provided on the rotor so that a region to be detected changes periodically and continuously with rotation of the rotor; and one or a plurality of detecting means for detecting regions of the targets; whereby detecting a torque applied to the input shaft, based on a difference between the regions detected by the detecting means resulting from twist of the torsion bar, and also relates to a steering apparatus for driving an electric motor based on the result of detection of the torque detecting apparatus so as to generate a steering assist force.

There is a type of steering apparatus for automobile, which assists steering by driving the electric motor so as to reduce the driver's load. This steering apparatus comprises an input shaft connected to a steering wheel; an output shaft connected to a steering control wheel through a pinion and a rack; and a torsion bar connecting the input shaft and output shaft together, detects a steering torque applied to the input shaft with a detecting apparatus based on twist generated on the torsion bar, and drives and controls the steering assist electric motor interlocked with the output shaft, based on the steering torque detected by the torque detecting apparatus.

FIG. 1 is a schematic view illustrating schematically an example of the structures of essential portions of a torque detecting apparatus according to a proposal made in Japanese Patent Application Laid-Open No. 2000-352502 (U.S. patent application Ser. No. 09/719003) filed by the present applicant. FIG. 1 shows an application of this torque detecting apparatus to a steering apparatus, wherein, for example, eight protruding objects (targets) 7 formed of a magnetic material are provided at equal intervals and at a predetermined angle of inclination along a circumferential surface of an intermediate portion (rotor) 6 of an upper shaft (input shaft) 23 of a steering shaft whose upper end is connected to a steering wheel 4 and lower end is connected to a torsion bar 5. Moreover, in order to detect the approaching position of the protruding object 7 that moves in the axial direction of the upper shaft 23 upon rotation of the upper shaft 23, an MR sensor 1 (magneto-resistance effect element, that is detecting means) is provided parallel to the intermediate portion 6 with an appropriate space therebetween and fixed to an immovable portion of the body of vehicle.

The upper end of a lower shaft (output shaft) 18 of the steering shaft is connected to the torsion bar 5, and the lower end thereof is connected to a pinion 10. Like the upper shaft 23, eight protruding objects (targets) 9 formed of magnetic material are provided at equal intervals and at a predetermined angle of inclination along a circumferential surface of an intermediate portion (rotor) 8 of the lower shaft 18. Moreover, in order to detect the approaching position of the protruding object 9 that moves in the axial direction of the lower shaft 18 upon rotation of the lower shaft 18, an MR sensor 2 (magneto-resistance effect element, that is detecting means) is provided parallel to the lower shaft 18 with an appropriate space therebetween and fixed to an immovable portion of the body of vehicle.

The MR sensor 1 incorporates therein sensors 1A and 1B whose electric angle difference is 180° (i.e., for detecting the approaching positions of adjacent different protruding objects 7) so as to construct a dual system, and detection signals V1A and V1B indicating the approaching positions of the protruding objects 7 detected by the sensors 1A and 1B are respectively supplied to a calculating unit 3.

The MR sensor 2 incorporates therein sensors 2A and 2B whose electric angle difference is 180° (i.e., for detecting the approaching positions of adjacent different protruding objects 9) so as to construct a dual system, and detection signals V2A and V2B indicating the approaching positions of the protruding objects 9 detected by the sensors 2A and 2B are respectively supplied to the calculating unit 3.

The MR sensors 1 and 2 are provided so that the detection signals V1A and V2A are in phase and the detection signals V1B and V2B are in phase in a condition where no steering torque is applied to the steering wheel 4 and the torsion bar 5 is not twisted.

The twist angle of the torsion bar 5 is at most several degrees, and the calculating unit 3 calculates a steering torque, based on the difference between the detection signals V1A and V2A or between the detection signals V1B and V2B, and outputs the torque signal.

In the torque detecting apparatus having such a structure, whenever the upper shaft 23 and the lower shaft 18 rotate 45°, the protruding objects 7 and 9 closest to the detection faces of the respective sensors 1A, 1B and sensors 2A, 2B reciprocate in the axial direction of the upper shaft 23 and lower shaft 18. It is possible to arrange the positions of the protruding objects 7 and 9 closest to the detection faces of the respective sensors 1A, 1B and sensors 2A, 2B, in the axial direction of the upper shaft 23 and lower shaft 18, to correspond to the rotational angles of the upper shaft 23 and lower shaft 18.

Therefore, if the detection signals of the sensors 1A, 1B and sensors 2A, 2B are set to have a linear relation with every 45° rotational angle of the upper shaft 23 and lower shaft 18, it is possible to detect the rotational angles of the upper shaft 23 and lower shaft 18 based on the respective detection signals of the sensors 1A, 1B and sensors 2A, 2B by using counting of the number of times of up and down in the detection signals of the sensors 1A, 1B and sensors 2A, 2B. In addition, it is also possible to discriminate whether the sensors 1A, 1B and sensors 2A, 2B have detected the approaching positions of the respective protruding objects 7 and 9.

For example, in the case where the detection signals of the sensors 1A, 1B and sensors 2A, 2B are set to have a similar relation with the rotational angle (steering angle) of the upper shaft 23 and lower shaft 18, when the upper shaft 23 and lower shaft 18 are rotated, the detection signals of the sensors 1A, 1B and sensors 2A, 2B show voltage waveforms of a cycle of 45°, and the rotational angles of the upper shaft 23 and lower shaft 18 can be detected by the detection signals of the sensors 1A, 1B and sensors 2A, 2B, respectively.

Here, if a steering torque has been applied to the steering wheel 4 and the torsion bar 5 has a twist angle, the detection signals of the sensors 1A and 2A and the detection signals of the sensors 1B and 2B have a voltage difference ΔV according to the twist angle, and therefore it is possible to obtain the twist angle by calculating the voltage difference ΔV with the calculating unit 3 and to output a torque signal representing the steering torque.

The above-described torque detecting apparatus is constructed by providing the rotor 6 on the upper shaft 23 of the steering shaft as an intermediate portion thereof and providing the rotor 8 on the lower shaft 18 as an intermediate portion thereof, but it is difficult to provide the rotors 6 and 8 by precisely keeping a coaxial relation between their rotation axes and the upper shaft 23 and lower shaft 18, and if their relation is illustrated in an emphasized manner, as shown in FIG. 2, the rotation axes of the rotors 6 and 8 are mutually deflected.

Therefore, the positional relation between the MR sensor 1 and the protruding objects 7 and the positional relation between the MR sensor 2 and the protruding objects 9 are not the same depending on the rotations of the rotor 6 and rotor 8, and, if the detection signals of the respective sensors are illustrated in an emphasized manner, as shown in FIG. 3, rotational deflection drawing like a sine wave is generated entirely during one rotation of the rotors 6 and 8, resulting in a problem that an accurate steering torque can not be detected.

Note that, in FIG. 3, Pn and Bn represent the detection signal's peak value and bottom value, respectively.

BRIEF SUMMARY OF THE INVENTION

The present invention has been made with the aim of solving the problems, and it is an object of the first and second inventions to provide a torque detecting apparatus capable of restraining the influence of rotational deflection and detecting a more accurate steering torque.

It is an object of the third invention to provide a steering apparatus comprising a torque detecting apparatus according to the first or second invention.

A torque detecting apparatus according to the first invention is a torque detecting apparatus comprising for each of an input shaft and an output shaft that are connected with a torsion bar: a rotor; a plurality of targets provided on the rotor so that a region to be detected changes periodically and continuously with rotation of the rotor; and one or a plurality of detecting means for detecting regions of the targets, whereby detecting a torque applied to the input shaft, based on a difference between the regions detected by the detecting means resulting from twist generated on the torsion bar, and is characterized by comprising: discriminating means for discriminating the targets individually based on the regions detected by the detecting means; correction amount calculating means for calculating a correction amount for each of the targets so as to correct the regions detected by the detecting means, based on maximum values or minimum values of signals indicating the regions of each of the targets detected by the detecting means, upon one rotation of the rotors; storing means for storing the correction amounts calculated by the correction amount calculating means; and correcting means for correcting detected regions upon detection of the regions by the detecting means, based on the correction amounts stored in the storing means for the targets discriminated by the discriminating means, wherein the torque applied to the input shaft is detected based on the regions corrected by the correcting means.

In this torque detecting apparatus, each of the input shaft and the output shaft that are connected with the torsion bar is provided with a rotor, and a plurality of targets are provided on the rotor so that a region to be detected changes periodically and continuously with rotation of the rotor. One or a plurality of detecting means detect the approaching regions of the targets, and detect a torque applied to the input shaft, based on a difference between the regions detected by the detecting means resulting from twist generated on the torsion bar.

The discriminating means discriminates the targets individually based on the regions detected by the detecting means, and the correction amount calculating means calculates a correction amount for each of the targets so as to correct the regions detected by the detecting means, based on maximum values or minimum values of signals indicating the regions of each of the targets detected by the detecting means, upon one rotation of the rotors.

The storing means stores the correction amounts calculated by the correction amount calculating means, and the correcting means corrects detected regions upon detection of the regions by the detecting means, based on the correction amounts stored in the storing means for the targets discriminated by the discriminating means, so that the torque applied to the input shaft is detected based on the regions corrected by the correcting means.

Accordingly, it is possible to realize a torque detecting apparatus capable of restraining the influence of rotational deflection and detecting a more accurate steering torque.

A torque detecting apparatus according to the second invention is a torque detecting apparatus comprising for each of an input shaft and an output shaft that are connected with a torsion bar: a rotor; a plurality of targets provided on the rotor so that a region to be detected changes periodically and continuously with rotation of the rotor; and one or a plurality of detecting means for detecting regions of the targets, whereby detecting a torque applied to the input shaft, based on a difference between the regions detected by the detecting means resulting from twist generated on the torsion bar, and is characterized by comprising: storing means for storing a predetermined correction amount for each of the targets so as to correct the regions detected by the detecting means; discriminating means for discriminating the targets individually based on the regions detected by the detecting means; and correcting means for correcting detected regions upon detection of the regions by the detecting means, based on the correction amounts stored in the storing means for the targets discriminated by the discriminating means, wherein the torque applied to the input shaft is detected based on the regions corrected by the correcting means.

In this torque detecting apparatus, each of the input shaft and output shaft that are connected with the torsion bar has a rotor, and a plurality of targets are provided on the rotor so that a region to be detected changes periodically and continuously with rotation of the rotor. One or a plurality of detecting means detect the approaching regions of the targets, whereby detecting a torque applied to the input shaft, based on a difference between the regions detected by the detecting means resulting from twist generated on the torsion bar.

The storing means stores a predetermined correction amount for each of the targets so as to correct the regions detected by the detecting means, and the discriminating means discriminates the targets individually based on the regions detected by the detecting means. Upon detection of the regions by the detecting means, the correcting means corrects the detected regions based on the correction amounts stored in the storing means for the targets discriminated by the discriminating means, and the torque applied to the input shaft is detected based on the regions corrected by the correcting means.

Accordingly, it is possible to realize a torque detecting apparatus capable of restraining the influence of rotational deflection and detecting a more accurate steering torque.

A steering apparatus according to the third invention is characterized by comprising: an input shaft connected to a steering wheel; a steering assist electric motor which is driven and controlled based on a steering torque applied to the steering wheel; an output shaft interlocked with the electric motor; a torsion bar connecting the input shaft and the output shaft together; and the torque detecting apparatus as set forth in claim 1 or 2 for detecting a steering torque applied to the input shaft, wherein steering is assisted based on the steering torque detected by the torque detecting apparatus.

In this steering apparatus, the input shaft is connected to the steering wheel, the steering assist electric motor is driven and controlled based on the steering torque applied to the steering wheel, and the output shaft is interlocked with the electric motor. The torsion bar connects the input shaft and the output shaft together, the torque detecting apparatus as set forth in claim 1 or 2 detects the steering torque applied to the input shaft, and steering is assisted based on the steering torque detected by the torque detecting apparatus.

Accordingly, it is possible to realize a steering apparatus comprising a torque detecting apparatus capable of restraining the influence of rotational deflection and detecting a more accurate steering torque.

The above and further objects and features of the invention will more fully be apparent from the following detailed description with accompanying drawings.

DETAILED DESCRIPTION OF THE INVENTION

The following description will explain in detail the present invention with reference to the drawings illustrating some embodiments thereof.

Embodiment 1

Figure 1:
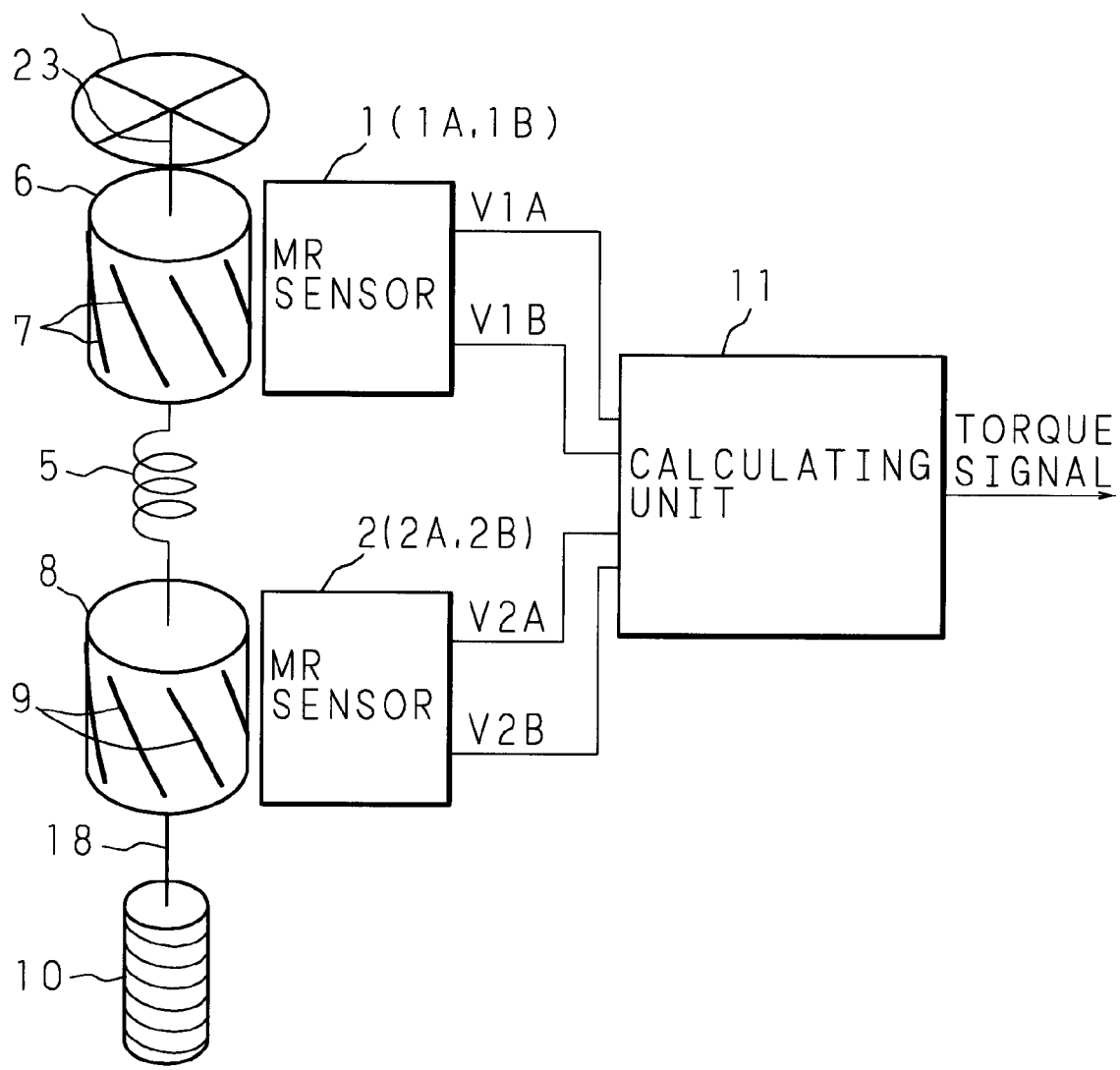
FIG. 1 is a schematic view illustrating schematically an example of the structures of essential portions of a conventional torque detecting apparatus.
Figure 2:
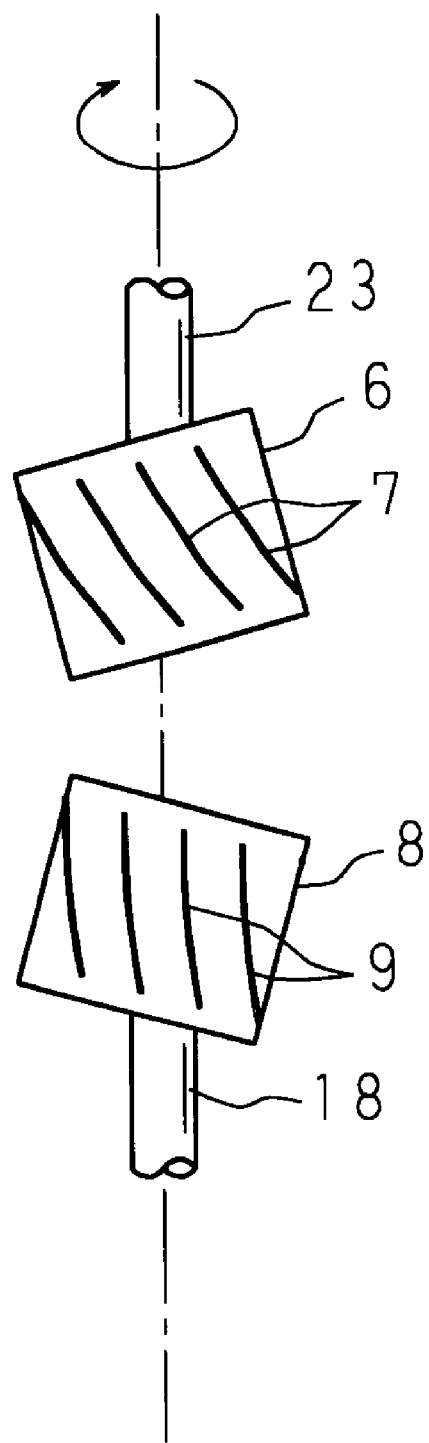
FIG. 2 is an explanatory view for explaining the operation of the conventional torque detecting apparatus.
Figure 3:
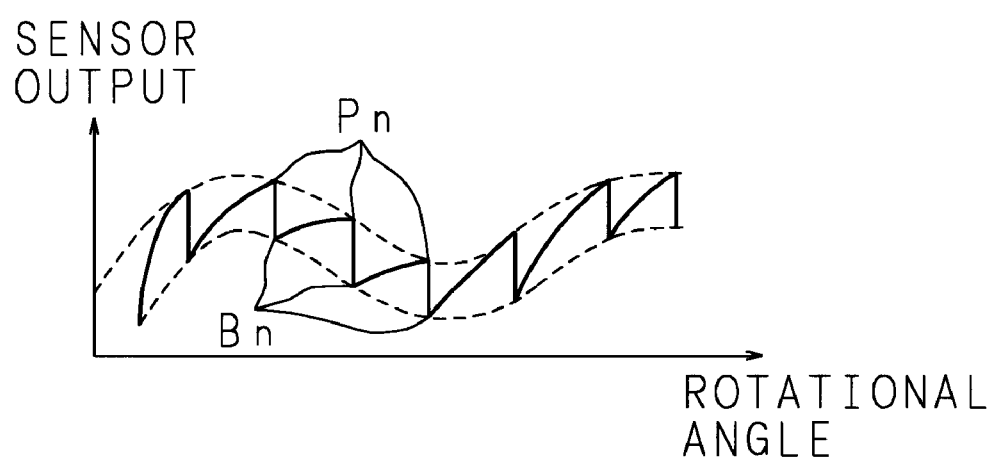
FIG. 3 is an explanatory view for explaining the operation of the conventional torque detecting apparatus.
Figure 4:
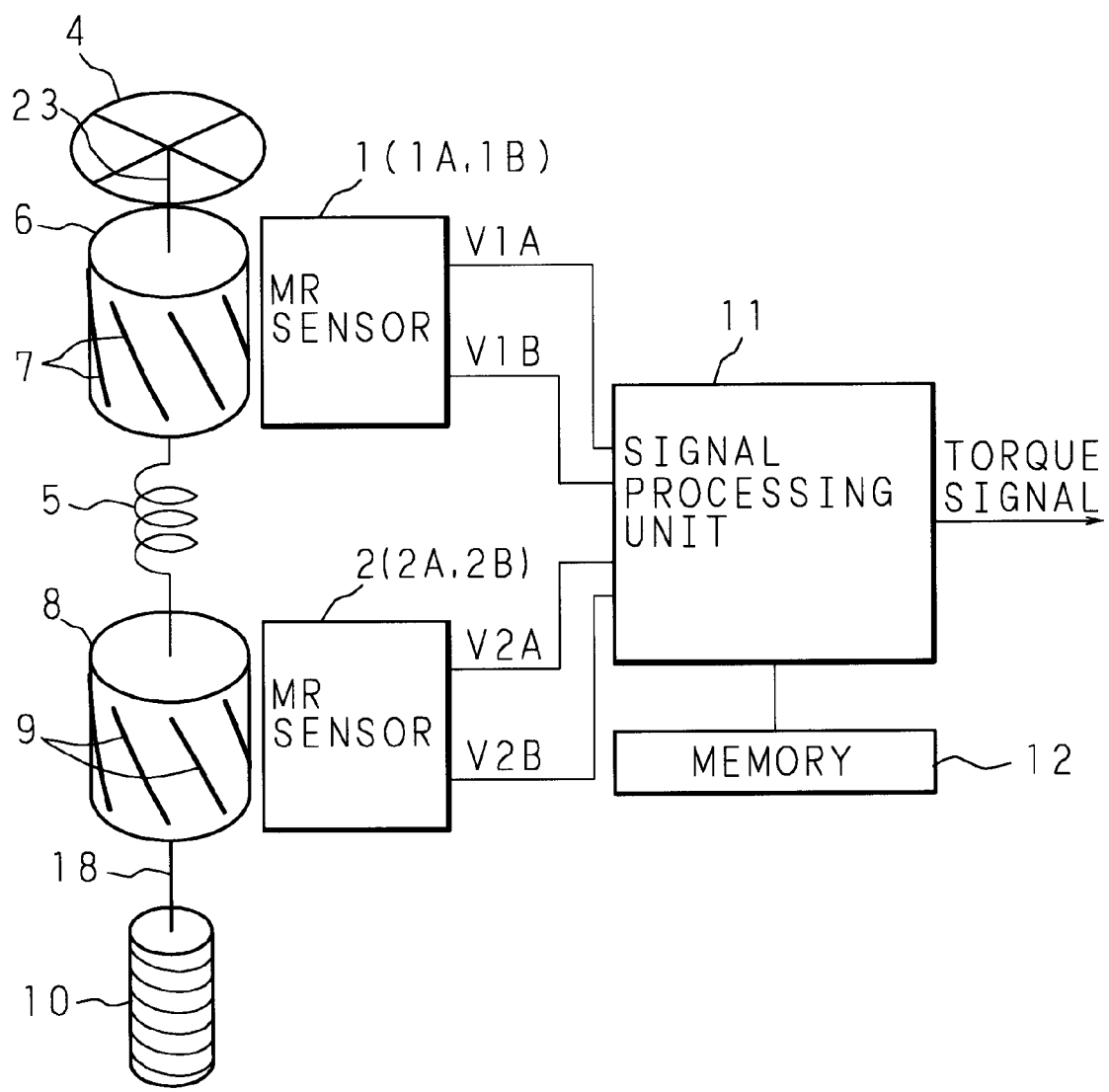
FIG. 4 is a schematic view illustrating schematically an example of the structures of essential portions of an embodiment of a torque detecting apparatus of the present invention.

FIG. 4 is a schematic view illustrating schematically an example of the structures of essential portions of an embodiment of a torque detecting apparatus according to the present invention. FIG. 4 shows an application of this torque detecting apparatus to a steering apparatus, wherein, for example, eight protruding objects (targets) 7 formed of a magnetic material are provided at equal intervals and at a predetermined angle of inclination along a circumferential surface of an intermediate portion (rotor) 6 of an upper shaft (input shaft) 23 of a steering shaft whose upper end is connected to a steering wheel 4 and lower end is connected to a torsion bar 5. Moreover, in order to detect the approaching position of the protruding object 7 that moves in the axial direction of the upper shaft 23 upon rotation of the upper shaft 23, an MR sensor 1 (magneto-resistance effect element, that is detecting means) is provided parallel to the intermediate portion 6 with an appropriate space therebetween and fixed to an immovable portion of the body of vehicle.

The upper end of a lower shaft (output shaft) 18 of the steering shaft is connected to the torsion bar 5, and the lower end thereof is connected to a pinion 10. Like the upper shaft 23, eight protruding objects (targets) 9 formed of magnetic material are provided spirally at equal intervals along a circumferential surface of an intermediate portion (rotor) 8 of the lower shaft 18. Moreover, in order to detect the approaching position of the protruding object 9 that moves in the axial direction of the lower shaft 18 upon rotation of the lower shaft 18, an MR sensor 2 (magneto-resistance effect element, that is detecting means) is provided parallel to the lower shaft 18 with an appropriate space therebetween and fixed to an immovable portion of the body of vehicle.

The MR sensor 1 incorporates therein sensors 1A and 1B whose electric angle difference is 180° (i.e., for detecting the approaching positions of adjacent different protruding objects 7) so as to construct a dual system, and detection signals V1A and V1B indicating the approaching positions of the protruding objects 7 detected by the sensors 1A and 1B are respectively supplied to a signal processing unit 11.

The MR sensor 2 incorporates therein sensors 2A and 2B whose electric angle difference is 180° (i.e., for detecting the approaching positions of adjacent different protruding objects 9) so as to construct a dual system, and detection signals V2A and V2B indicating the approaching positions of the protruding objects 9 detected by the sensors 2A and 2B are respectively supplied to the signal processing unit 11.

The MR sensors 1 and 2 are provided so that the detection signals V1A and V2A are in phase and the detection signals V1B and V2B are in phase in a condition where no steering torque is applied to the steering wheel 4 and the torsion bar 5 is not twisted.

The twist angle of the torsion bar 5 is at most several degrees, and the signal processing unit 11 corrects the detection signals V1A, V2A, V1B and V1B based on correction amounts stored in a memory 12, calculates a steering torque, based on the difference between the corrected detection signals V1A and V2A or between the corrected detection signals V1B and V2B, and outputs the torque signal.

The following description will explain the operation of the torque detecting apparatus having such a structure.

In this torque detecting apparatus, whenever the upper shaft 23 and the lower shaft 18 rotate 45°, the protruding objects 7 and 9 closest to the detection faces of the sensors 1A, 1B and sensors 2A, 2B reciprocate in the axial direction of the upper shaft 23 and lower shaft 18. It is possible to arrange the positions of the protruding objects 7 and 9 closest to the detection faces of the sensors 1A, 1B and sensors 2A, 2B, in the axial direction of the upper shaft 23 and lower shaft 18, to correspond to the rotational angles of the upper shaft 23 and lower shaft 18.

Therefore, if the detection signals of the sensors 1A, 1B and sensors 2A, 2B are set to have a linear relation with every 45° rotational angle of the upper shaft 23 and lower shaft 18, it is possible to detect the rotational angles of the upper shaft 23 and lower shaft 28 based on the respective detection signals of the sensors 1A, 1B and sensors 2A, 2B by using counting of the number of times of up and down in the detection signals of the sensors 1A, 1B and sensors 2A, 2B. In addition, it is also possible to discriminate whether the sensors 1A, 1B and sensors 2A, 2B have detected the approaching positions of the respective protruding objects 7 and 9.

For example, in the condition where the detection signals of the sensors 1A, 1B and sensors 2A, 2B are set to have a similar linear relation with the rotational angle (steering angle) of the upper shaft 23 and lower shaft 18, when the upper shaft 23 and lower shaft 18 are rotated, the detection signals of the sensors 1A, 1B and sensors 2A, 2B show voltage waveforms of a cycle of 45°, and the rotational angles of the upper shaft 23 and lower shaft 18 can be detected based on the detection signals of the sensors 1A, 1B and sensors 2A, 2B, respectively.

Here, if a steering torque has been applied to the steering wheel 4 and the torsion bar 5 has a twist angle, the detection signals of the sensors 1A and 2A and the detection signals of the sensor 1B and 2B have a voltage difference ΔV according to the twist angle, and therefore it is possible to obtain the twist angle by calculating the voltage difference ΔV with the signal processing unit 11 and to output a torque signal representing the steering torque.

Figure 5:
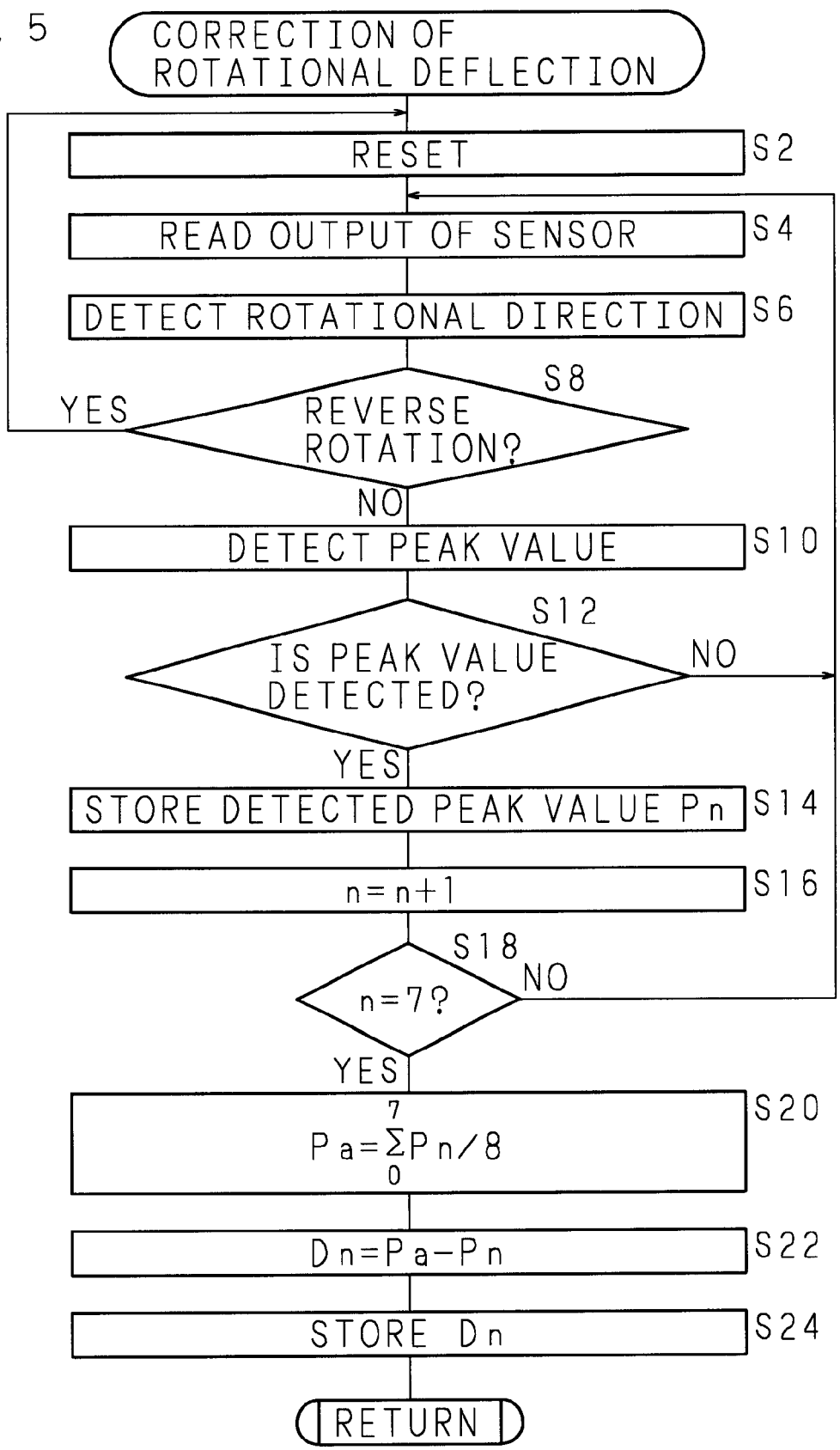
FIG. 5 is a flow chart showing an operation of correcting the influence of rotational deflection on one detection signal among detection signals of sensors of the torque detecting apparatus of the present invention.

FIG. 5 is a flow chart showing an operation of correcting the influence of rotational deflection on one detection signal among the detection signals of the sensors 1A, 1B, 2A and 2B of this torque detecting apparatus. With reference to this flow chart, the following description will explain the operation of correcting rotational deflection.

The signal processing unit 11 of this torque detecting apparatus performs the operation of correcting rotational deflection upon a driver's instruction, or freely. The signal processing unit 11 first resets a parameter n to zero for initialization (S2), and then reads a sensor output (detection signal) (S4). The signal processing unit 11 detects a rotational direction of the steering wheel 4 from the read detection signal (S6), and, if the rotational direction is not reverse direction to a previously detected rotational direction (YES at S8), the signal processing unit 11 performs an operation of detecting a peak value Pn of the detection signal which detects the approaching position of a target Tn as one of the protruding objects 7, 9 (S10). Note that it is also possible to detect a bottom value Bn instead of the peak value Pn.

The judgement of the rotational direction of the steering wheel 4 (S6) and the detection of the peak value Pn or bottom value Bn (S10) are made based on the difference between detection signals which were continuously read a plurality of times.

The signal processing unit 11 performs the operation of detecting the peak value Pn of the detection signal which detects the approaching position of the target Tn (S10), and, if the peak value Pn is not detected (NO at S12), the signal processing unit 11 reads the next detection signal (S4).

If the rotational direction detected (S6) is reverse direction to a previously detected rotational direction (YES at S8), the signal processing unit 11 resets the parameter n to zero for initialization (S2), and performs the operation of correcting rotational deflection again from the beginning.

The signal processing unit 11 performs the operation of detecting the peak value Pn (S10), and, if the peak value Pn is detected (S12), it temporarily stores the peak value Pn of the detection signal which detects the approaching position of the target Tn (S14) and adds one to the parameter n (S16).

The signal processing unit 11 judges whether the parameter n to which one was added (S16) is seven (S18), and, if the parameter n is not seven, it reads the next detection signal (S4).

When the signal processing unit 11 judged that the parameter n is seven (YEA at S18), it has obtained peak values P0 to P7 of the detection signals by the targets T0 to T7 during one rotation of the steering wheel 4 in the same direction.

Next, the signal processing unit 11 calculates "Pa=(P0+P1+ . . . +P7)/8" to obtain an average value Pa of the peak values P0 to P7 (S20).

Next, the signal processing unit 11 performs calculations for obtaining the differences between the obtained average value Pa (S20) and the respective peak values P0 to P7 of the targets T0 to T7 so as to obtain deviations D0 to D7 of the targets T0 to T7 (S22), stores them in the memory 12 (S24), and returns.

Figure 7:
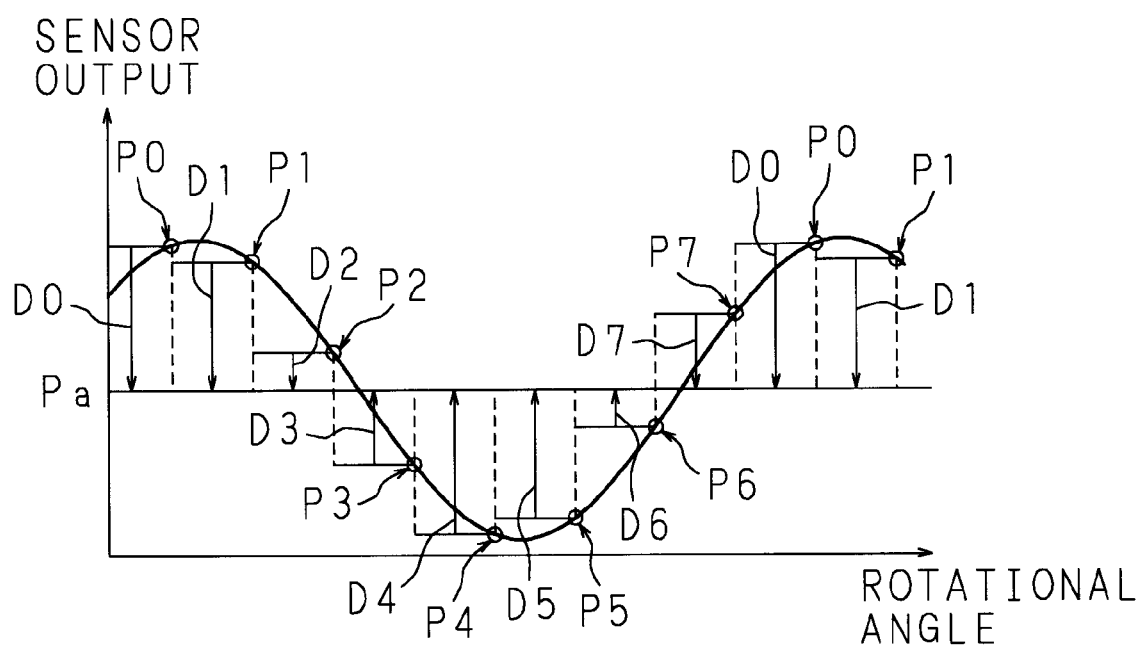
FIG. 7 is an explanatory view for explaining the operation of the torque detecting apparatus of the present invention.

Consequently, as shown in FIG. 7, the respective correction amounts of the detection signals for rotational deflection of the respective targets T0 to T7 can be obtained as the deviations D0 to D7 between the average value Pa and the peak values P0 to P7 of the targets T0 to T7.

The signal processing unit 11 executes the above-described operation of correcting rotational deflection with respect to the detection signals of the sensors 1A, 1B, 2A and 2B so as to obtain the deviations D0 to D7 of the detection signals (S22), and stores them in the memory 12 (S24).

It should be noted that the above-described operation of correcting rotational deflection may be performed in assembling the torque detecting apparatus, and the deviations D0 to D7 of the detection signals may be stored on a ROM by using the ROM as the memory 12.

Figure 6:
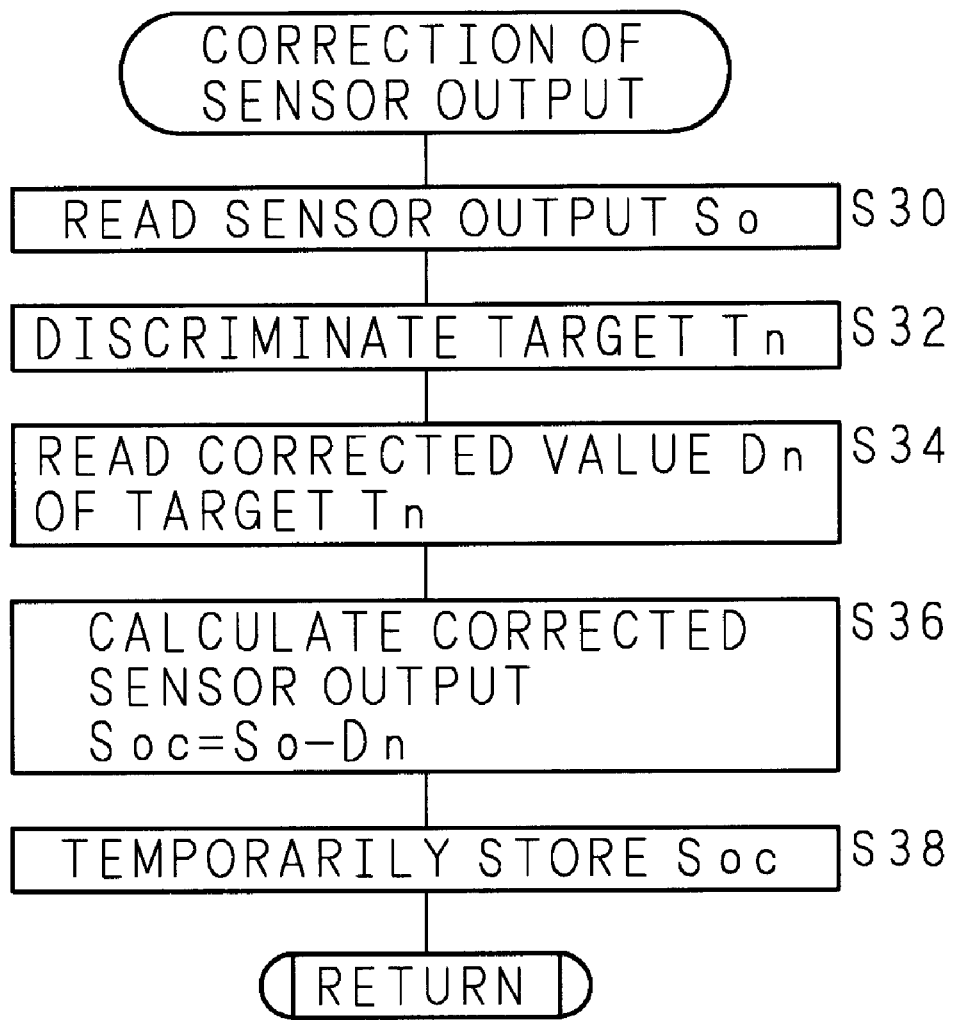
FIG. 6 is a flow chart showing an operation during actual driving of a vehicle of correcting the influence of rotational deflection on one sensor output among sensor outputs of the torque detecting apparatus of the present invention.

FIG. 6 is a flow chart showing an operation of correcting the influence of rotational deflection on one sensor output among the sensor outputs (detection signals) of the sensors 1A, 1B, 2A and 2B of this torque detecting apparatus during actual driving of a vehicle. Referring to this flow chart, the following description will explain the operation of correcting rotational deflection of the sensor output.

The signal processing unit 11 of this torque detecting apparatus first reads a sensor output So (detection signal) (S30), and discriminates a target Tn based on the read sensor output So (S32).

Discriminating of the target Tn (S32) is performed by detecting a peak value of the sensor output So from the target and storing which number in which direction the detected peak is located from the middle point.

Next, the signal processing unit 11 reads a correction value Dn for the discriminated target Tn (S32) from the memory 12 (S34), and calculates "So-Dn" to obtain a corrected sensor output Soc (S36).

The signal processing unit 11 temporarily stores the corrected sensor output Soc obtained in S36 (S38), and returns.

Figure 8:
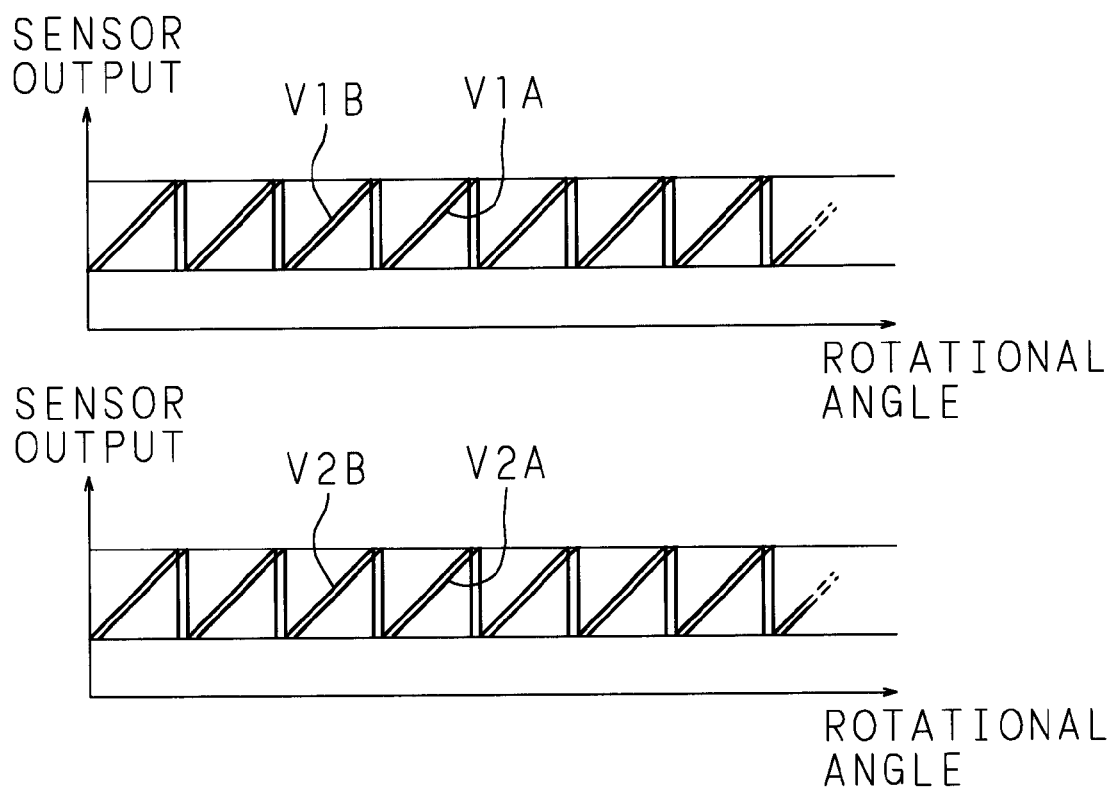
FIG. 8 is an explanatory view for explaining the operation of the torque detecting apparatus of the present invention.

The signal processing unit 11 executes the above-described operation of correcting the influence of rotational deflection with respect to the sensor outputs (detection signals) of the sensors 1A, 1B, 2A and 2B. Consequently, as shown in FIG. 8, rotational deflection does not occur during one rotation of the rotors 6 and 8, and the sensor outputs of the sensors 1A, 1B, 2A and 2B enable calculation and output of an accurate steering torque.

Embodiment 2

Figure 9:
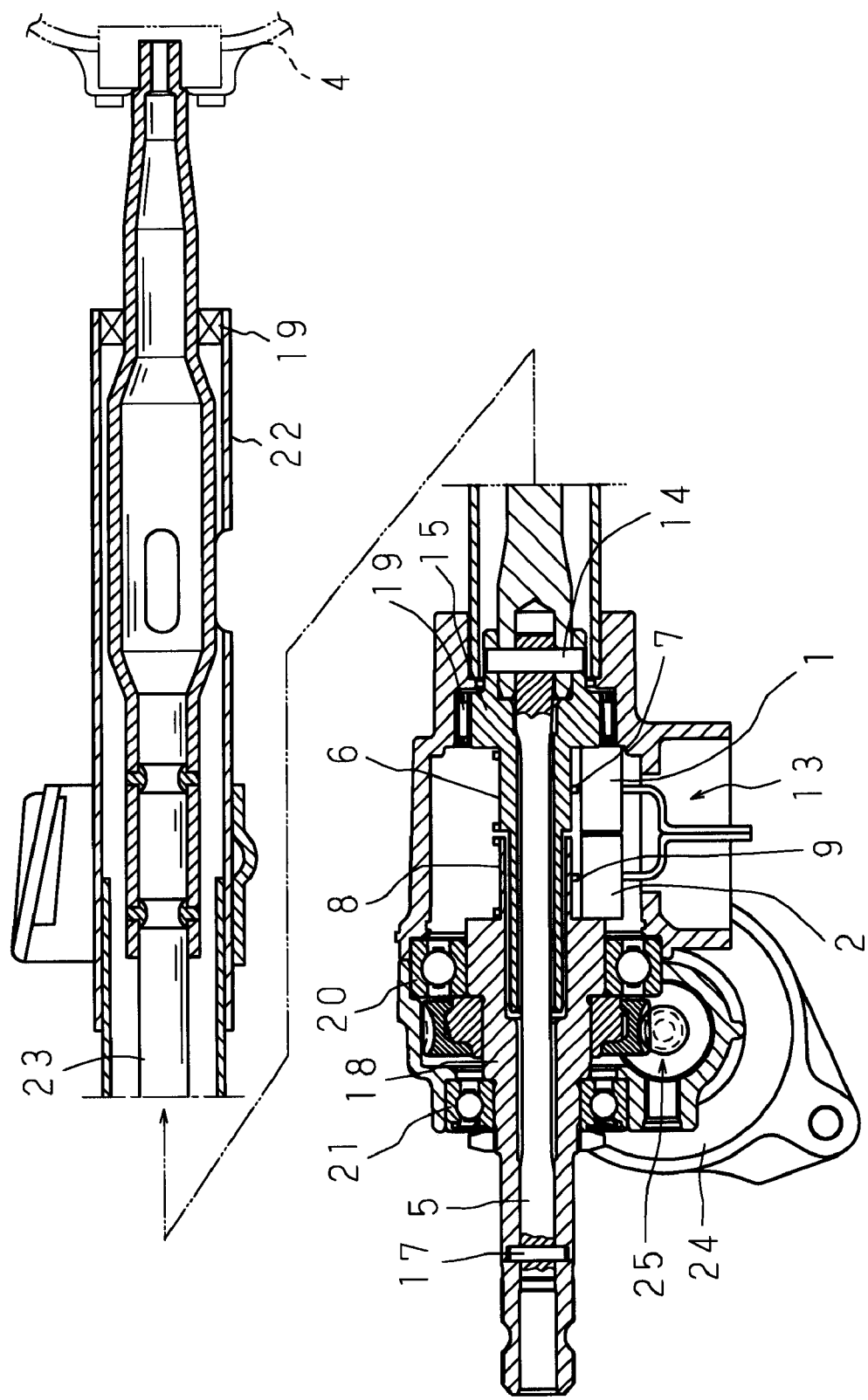
FIG. 9 is a vertical cross sectional view illustrating the structures of essential portions of an embodiment of a steering apparatus of the present invention.

FIG. 9 is a vertical cross sectional view illustrating the structures of essential portions of Embodiment 2 of a steering apparatus of the present invention. This steering apparatus comprises an upper shaft 23 to which a steering wheel 4 is attached at its upper end, and the lower end of the upper shaft 23 is connected through a first dowel pin 14 to a cylindrical input shaft 15 and the upper end of a torsion bar 5 to be inserted into the input shaft 15. A cylindrical output shaft 18 is connected to the lower end of the torsion bar 5 through a second dowel pin 17, and the upper shaft 23, input shaft 15 and output shaft 18 are supported rotatably in a housing 22 through bearings 19, 20 and 21.

Disposed inside this housing 22 are a torque detecting apparatus 13 for detecting a steering torque based on a relative displacement between the input shaft 15 and the output shaft 18 connected together through the torsion bar 5; a reduction mechanism 25 for reducing rotation of a steering assist electric motor 24 which is driven based on the result of detection of the torque detecting apparatus 13 and for transmitting the rotation to the output shaft 18 so as to assist the operation of a steering mechanism according to the rotation of the steering wheel 4 by the rotation of the electric motor 24 and reduce a driver's working load for steering. The lower end of the output shaft 18 is connected to a rack-and-pinion type steering mechanism through a universal joint.

The torque detecting apparatus 13 includes, for example, eight protruding objects 7 which are formed of a magnetic material and are provided at equal intervals and at a predetermined angle of inclination along a circumferential surface (rotor) 6 of the input shaft 15; and an MR sensor 1 (magneto-resistance effect element, that is detecting means) which is provided parallel to the input shaft 15 with an appropriate space therebetween and fixed to an immovable portion of the body of vehicle so as to detect the approaching position of the protruding object 7 that moves in the axial direction of the input shaft 15 upon rotation of the input shaft 15.

The MR sensor 1 incorporates therein two sensors whose electric angle difference is 180° (i.e., for detecting the approaching positions of adjacent different protruding objects 7) so as to construct a dual system, and detection signals indicating the approaching positions of the protruding objects 7 detected by the two sensors are respectively supplied to a signal processing unit, not shown.

Like the input shaft 15, the output shaft 18 is provided with, for example, eight protruding objects 9 which are formed of magnetic material and provided at equal intervals and at a predetermined angle of inclination along a circumferential surface (rotor) 8 of the output shaft 18. Moreover, in order to detect the approaching position of the protruding object 9 that moves in the axial direction of the output shaft 18 upon rotation of the output shaft 18, an MR sensor 2 (magneto-resistance effect element, that is detecting means) is provided parallel to the output shaft 18 with an appropriate space therebetween and fixed to an immovable portion of the body of vehicle.

The MR sensor 2 incorporates therein two sensors whose electric angle difference is 180° (i.e., for detecting the approaching positions of adjacent different protruding objects 9) so as to construct a dual system, and detection signals indicating the approaching positions of the protruding objects 9 detected by the two sensors are respectively supplied to the signal processing unit, not shown.

The following description will explain the operation of the steering apparatus having such a structure.

When the input shaft 15 and output shaft 18 are rotated without twisting the torsion bar 5, the input shaft 15, output shaft 18 and torsion bar 5 rotate integrally.

Upon rotation of the input shaft 15 and output shaft 18, the protruding objects 7 and 9 closest to the detection faces of the two sensors of each of the MR sensors 1 and 2 move in the axial direction of the input shaft 15 and output shaft 18. Since the protruding objects 7 and 9 are provided at equal intervals and at a predetermined angle of inclination along the circumferential surfaces 6 and 8 of the input shaft 15 and output shaft 18, it is Possible to arrange the positions of the protruding objects 7 and 9 closest to the detection faces of the two sensors of each of the MR sensors 1 and 2, in the axial direction of the input shaft 15 and output shaft 18, to correspond to the rotational angles of the input shaft 15 and output shaft 18.

For example, in the condition where the output voltages of the two sensors of each of the MR sensors 1 and 2 and the rotational angle (steering angle) of the input shaft 15 and output shaft 18 have set to have a similar linear relation, when the input shaft 15 and output shaft 18 are rotated once, as shown in FIG. 8, the outputs of the two sensors of each of the MR sensors 1 and 2 show voltage waveforms of a cycle of 45°.

At this time, as explained in Embodiment 1, the signal processing unit corrects the influence of rotational deflection of the circumferential surfaces 6 and 8 (rotors).

When the input shaft 15 and output shaft 18 are rotated with the torsion bar 5 being twisted due to application of a steering torque to the steering wheel 4, the output voltages of the respective sensors of the MR sensors 1 and 2 have a voltage difference according to the twist angle. The output voltage of the two sensors of each of the MR sensors 1 and 2 are supplied to the signal processing unit, not shown, through output cables, and then, as explained in Embodiment 1, the signal processing unit corrects the influence of rotational deflection of the circumferential surfaces 6 and 8 (rotors) on the output voltages of the respective sensors and calculates the difference between the corrected output voltages, thereby enabling output of a signal according to the steering torque.

According to the torque detecting apparatuses of the first and second inventions, it is possible to realize torque detecting apparatuses capable of restraining the influence of rotational deflection and detecting a more accurate steering torque.

According to the steering apparatus of the third invention, it is possible to realize a steering apparatus incorporating a torque detecting apparatus capable of restraining the influence of rotational deflection and detecting a more accurate steering torque.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A torque detecting apparatus comprising for each of an input shaft and an output shaft that are connected with a torsion bar: a rotor; a plurality of targets provided on said rotor so that a region to be detected changes periodically and continuously with rotation of said rotor; and one or a plurality of detecting means for detecting regions of said targets, whereby detecting a torque applied to said input shaft, based on a difference between the regions detected by said detecting means resulting from twist generated on said torsion bar, further comprising:

discriminating means for discriminating said targets individually based on the regions detected by said detecting means;

correction amount calculating means for calculating a correction amount for each of said targets so as to correct the regions detected by said detecting means, based on maximum values or minimum values of signals indicating the regions of each of said targets detected by said detecting means, upon one rotation of said rotor;

storing means for storing the correction amounts calculated by said correction amount calculating means; and correcting means for correcting detected regions upon detection of the regions by said detecting means, based on the correction amounts stored in said storing means for the targets discriminated by said discriminating means; wherein the torque applied to said input shaft is detected based on the regions corrected by said correcting means.

2. A torque detecting apparatus comprising for each of an input shaft and an output shaft that are connected with a torsion bar; a rotor; a plurality of targets provided on said rotor so that a region to be detected changes periodically and continuously with rotation of said rotor; and one or a plurality of detecting means for detecting regions of said targets, whereby detecting a torque applied to said input shaft, based on a difference between the regions detected by said detecting means resulting from twist generated on said torsion bar, further comprising:

storing means for storing a predetermined correction amount for each of said targets so as to correct the regions detected by said detecting means;

discriminating means for discriminating said targets individually based on the regions detected by said detecting means; and correcting means for correcting detected regions upon detection of the regions by said detecting means, based on the correction amounts stored in said storing means for the targets discriminated by said discriminating means, wherein the torque applied to said input shaft is detected based on the regions corrected by said correcting means.

3. A steering apparatus, comprising:

an input shaft connected to a steering wheel;

a steering assist electric motor which is driven and controlled based on a steering torque applied to said steering wheel;

an output shaft interlocked with said electric motor;

a torsion bar connecting said input shaft and said output shaft together;

a torque detecting apparatus as set forth in claim 1 for detecting a steering torque applied to said input shaft, wherein steering is assisted based on the steering torque detected by said torque detecting apparatus.

4. A steering apparatus, comprising:

an input shaft connected to a steering wheel;

a steering assist electric motor which is driven and controlled based on a steering torque applied to said steering wheel;

an output shaft interlocked with said electric motor;

a torsion bar connecting said input shaft and said output shaft together;

the torque detecting apparatus as set forth in claim 2 for detecting a steering torque applied to said input shaft, wherein steering is assisted based on the steering torque detected by said torque detecting apparatus.

* * * * *